United States Patent [19]

Scheithauer et al.

[11] Patent Number: 4,626,425

[45] Date of Patent: Dec. 2, 1986

[54] RECOVERY OF TUNGSTEN FROM AMMONIACAL SOLUTIONS

[75] Inventors: Richard A. Scheithauer; Clarence D. Vanderpool; Martin B. MacInnis; Michael J. Miller, all of Towanda, Pa.

[73] Assignee: GTE Products Corporation, Stamford, Conn.

[21] Appl. No.: 704,840

[22] Filed: Feb. 25, 1985

[51] Int. Cl.$^4$ ............................................. C01G 41/00
[52] U.S. Cl. .................................................... 423/593
[58] Field of Search ........................................ 423/593

[56] References Cited

U.S. PATENT DOCUMENTS 3,052,516  9/1962  Drobnick et al. .................. 423/593

Primary Examiner—John Doll
Assistant Examiner—Wayne A. Langel
Attorney, Agent, or Firm—Donald R. Castle

[57] ABSTRACT

A method is disclosed for recovering tungsten from a relatively dilute ammoniacal tungsten solution. The method involves adding hexamethylenetetramine to the tungsten solution in an amount sufficient to form a hexamethylenetetramine complex then adjusting the pH to from about 1.0 to about 2.0 with a mineral acid to form a precipitate of the complex containing at least about 99% of the tungsten, and separating the precipitate from the resulting mother liquor.

4 Claims, No Drawings

RECOVERY OF TUNGSTEN FROM AMMONIACAL SOLUTIONS

FIELD OF THE INVENTION

This invention relates to a method for recovering tungsten from relatively dilute ammoniacal tungsten solutions. More particularly, it relates to a method for recovering tungsten from relatively dilute ammoniacal solutions by precipitating the tungsten with hexamethylenetetramine.

BACKGROUND OF THE INVENTION

Tungsten concentrates are converted to sodium tungstate solution by digestion in sodium hydroxide or sodium carbonate or by pressure leaching with sodium hydroxide or sodium carbonate. The resulting sodium tungstate solution is then purified and converted to ammonium tungstate via a tungsten solvent extraction system. The ammonium tungstate solution is then subjected to an evaporation process to precipitate ammonium paratungstate which is the precurser of pure tungstic oxide, which can be reduced to tungsten metal.

The above process typically results in recovery of about 85% of the tungsten from the ammonium tungstate solution. The other 15% remaining in the ammonium paratungstate mother liquor is recycled back to the start of the process, that it, the caustic digestion, etc.

Therefore, a process which eliminates the recycling of this remaining 15% through the entire process would be an advancement in the art.

SUMMARY OF THE INVENTION

In accordance with one aspect of this invention, there is provided a method for recovering tungsten from a relatively dilute ammoniacal tungsten solution. The method involves adding hexamethylenetetramine to the tungsten solution in an amount sufficient to form a hexamethylenetetramine complex, adjusting the pH of the resulting hexamethylenetetramine treated solution with a mineral acid to from about 1.0 to about 2.0 to form a precipitate of the complex containing at least about 99% of the tungsten and a mother liquor, and separating the precipitate from the mother liquor.

DETAILED DESCRIPTION OF THE INVENTION

For a better understanding of the present invention, together with other and further objects, advantages, and capabilities thereof, reference is made to the following disclosure and appended claims in connection with the above description of some of the aspects of the invention.

By this invention, tungsten is recovered from dilute ammoniacal solutions by precipitation with hexamethylenetetramine.

In general, any dilute ammoniacal tungsten solution can be used, but preferably and most typically the spent mother liquors from precipiation of ammonium paratungstate from ammonium tungstate solutions are used. Typically these solutions contain from about 1.0 to about 30 grams of tungsten per liter but most typically from about 5.0 to about 10.0 grams of tungsten per liter.

Hexamethylenetetramine is then added to this solution to form a complex with the tungsten. Generally from about 0.25 to about 2.0 moles and preferably from about 0.50 to about 1.0 moles of hexamethylenetetramine per mole of tungsten is needed to form the complex so that essentially all of the tungsten subsequently precipitates.

Next, the pH of the resulting hexamethylenetetramine treated solution is adjusted with a mineral acid preferably sulfuric acid to the range at which a stable precipitate of the complex forms. This is from about 1.0 to about 2.0. At pH values above about 7.0 (which is the condition of the hexamethylenetetramine treated solution) no precipitation takes place. At pH values between about 7.0 and about 5.0, precipitation occurs but the solids very slowly dissolve. Below a pH of about 5.0, the precipitation is permanent. Near complete precipitation of tungsten is not seen until a pH of from about 1.0 to about 2.0 is reached.

Preferably the pH adjusted mixture is allowed to agitate for about 2 hours at less than about 20° C. to allow the formation of the precipitate and the mother liquor. The precipitate contains at least about 99% of the tungsten which was originally present in the starting ammoniacal tungsten solution.

The precipitate is then separated from the mother liquor by any standard technique such as filtration.

The mother liquor can be processed by conventional methods for recovery of ammonia.

The precipitate of tungsten hexamethylenetetramine can then be processed to convert tungsten to more usable forms. For example, it can be digested in a solution of aqueous ammonia at greater than about 90° C. for sufficient time to produce ammonium paratungstate. The resulting mother liquor from this operation contains some tungsten, however, because the hexamethylenetetramine is also contained in this liquor, it can be used again to precipitate tungsten from other ammoniacal tungsten solutions.

To more fully illustrate this invention, the following non-limiting example is presented. All parts, portions, and percentages are on a weight basis unless otherwise stated.

EXAMPLE

About 0.5 moles of hexamethylenetetramine is added to a spent ammonium paratungstate mother liquor containing about 1.0 moles of tungsten. The pH is then adjusted to about 2.0 with concentrated sulfuric acid. The temperature is maintained at no greater than about 20° C. during the precipitation of the tungsten hexamethylenetetramine. The resulting precipiated is then filtered off. Greater than about 99% of the starting tungsten is recovered in the precipitate. Therefore, there is no need to recycle the spent ammonium paratungstate mother liquor back through the initial stages of the tungsten recovery process.

While there has been shown and described what are at present considered the preferred embodiments of the invention, it will be obvious to those skilled in the art that various changes and modifications may be made therein without departing from the scope of the invention as defined by the appended claims.

What is claimed is:

1. A method for recovering tungsten from a relatively dilute ammoniacal tungsten solution, said method comprising:
   (a) adding hexamethylenetetramine to said tungsten solution in an amount sufficient to form a hexamethylenetetramine complex;
   (b) adjusting the pH of the resulting hexamethylenetetramine treated solution with a mineral acid to from about 1.0 to about 2.0 to form a precipitate of said complex containing at least about 99% of the tungsten and a mother liquor;

(c) separating said precipitate from said mother liquor.

2. A method according to claim 1 wherein the concentration of said ammoniacal solution is from abdut 5 to about 10 grams of tungsten per liter.

3. A method according to claim 1 wherein from about 0.5 to about 1.0 moles of hexamethylenetetramine per mole of tungsten is added to said tungsten solution.

4. A method according to claim 1 wherein said mineral acid is sulfuric acid.

* * * * *